United States Patent [15] 3,676,869

Lazzari et al. [45] July 11, 1972

[54] INTEGRATED LOW-LEVEL MAGNETIC DECODER

[72] Inventors: Jean-Pierre Lazzari, Seyssinet; Igor Melnick, Grenoble, both of France

[73] Assignees: Commissariat A L'Energie Atomique, Paris; Compagnie International Pour L'Informatique, Lowvecennes, France

[22] Filed: Feb. 2, 1971

[21] Appl. No.: 111,856

[30] Foreign Application Priority Data

Feb. 13, 1970 France ..................................7005127

[52] U.S. Cl. .............340/174 QA, 340/174 TF, 340/174 JA, 340/174 HP

[51] Int. Cl. ..........................................................G11c 11/14

[58] Field of Search ................340/174 QA, 174 JA, 174.1 F; 179/100.2 CF

[56] References Cited

UNITED STATES PATENTS 3,512,143 5/1970 Feissel et al. .....................340/174 JA

*Primary Examiner*—James W. Moffiti
*Attorney*—Cameron, Kerkam & Sutton

[57] ABSTRACT

The decoder comprises a magnetic circuit in the form of a closed loop consisting of two parallel components which are formed of identical magnetic material having the same thickness and are joined together at their extremities, a primary winding and a secondary winding each housed within the interior and at one end of the loop, a control winding located between the primary and secondary windings and passed through the center of each component along the axis of easy magnetization of the magnetic circuit, the space formed within the interior of the loop being filled with insulating material.

3 Claims, 4 Drawing Figures

INTEGRATED LOW-LEVEL MAGNETIC DECODER

This invention is concerned with an integrated low-level magnetic decoder which is primarily intended for use in conjunction with magnetic memory systems and magnetic heads, that is to say a magnetic device which, when an electric signal is fed to its input, delivers at its output an electric signal whose power is dependent on the electric power which is applied to its control input. The output signal becomes weaker as the control signal is stronger and conversely. Low-power signals are usually applied to the input of said low-level decoder.

In the description of the invention which now follows, reference will be made to the accompanying drawings, in which.

Figure 1:
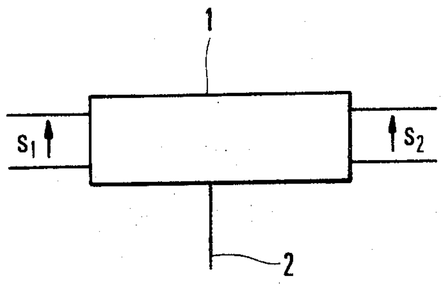
FIG. 1 is a diagrammatic illustration of a decoder.

Broadly speaking, a low-level decoder can be characterized by a quadripole 1 as shown in FIG. 1. If $S_1$ designates the input signal and $S_2$ designates the output signal, the ratio $S_2/S_1$ can be modified by means of an external control 2 either continuously or on the all-or-none principle.

Two types of low-level decoders are commercially available, namely semiconductor decoders and magnetic decoders. It is pointed out that decoders of the first type are subject to disadvantages in that they entail the need for operating power (additional supply) in addition to control power and have a background noise which is not negligible. These disadvantages are overcome by magnetic decoders and this invention is solely concerned with these latter.

In known devices of this type, a so-called control winding is provided between the primary and secondary windings of a transformer having a magnetic circuit. When an electric current passes through the control winding, the magnetic circuit is saturated and the coupling between the primary and secondary windings is consequently modified.

In spite of marked improvements over the semiconductor devices, magnetic decoders are still attended by a considerable number of disadvantages. In the first place, the design concept and shape of said decoders is not well suited to processing of the input and output signal of integrated magnetic heads; again on account of their shape and basic design, these devices fail to achieve a high standard of efficiency. Moreover, when current is passed through the control winding, it produces a spurious signal in the primary and secondary windings.

The invention relates to an integrated low-level magnetic decoder which meets practical requirements more effectively than comparable devices of the prior art, especially by overcoming the disadvantages described in the foregoing while entailing low capital expenditure.

The device which is proposed in accordance with the invention consists of an integrated low-level decoder which essentially comprises a magnetic circuit in the form of a closed loop and made up of two parallel components formed of identical magnetic material having the same thickness and joined together at their extremities, a primary winding and a secondary winding housed within the interior and each located at one end of said loop, a control winding located between said primary and secondary windings and passed through each of said two components strictly at the midpoint of the thickness thereof and along the axis of easy magnetization of the magnetic circuit, the space formed between said primary and secondary windings within the interior of the loop being filled with insulating material.

The utilization of the device according to the invention entails on the one hand the use of a magnetic circuit having low reluctance and on the other hand a method of manufacture of the primary and secondary windings.

The low-reluctance magnetic circuit can advantageously be formed by making use of the elements described in U.S. Pat. application Ser. No. 81,882 filed in the name of the present applicant on Oct. 19, 1970 and titled "Magnetic Circuit Having Low Reluctance." This patent describes in particular a circuit of this type which is made up of one or more thin-film layers formed of an Fe-Ni-Cr alloy.

So far as the method of manufacture of the primary and secondary windings is concerned, this method consists in employing a technique of vacuum evaporation of thin films. A method of this type is described in U.S. Pat. application Ser. No. 81,881 filed in the name of the present applicant on Oct. 19, 1970 and titled "Integrated Magnetic Head and Method of Manufacture of Said Head." In this patent, the description mainly relates to windings of this type which are constituted by an alternate succession of electrically conducting and electrically insulating film layers arranged in superposed relation.

A better understanding of the invention will be obtained by consideration of the following description of one embodiment of the invention which is given by way of explanatory example but not in any sense by way of limitation.

Figure 2:
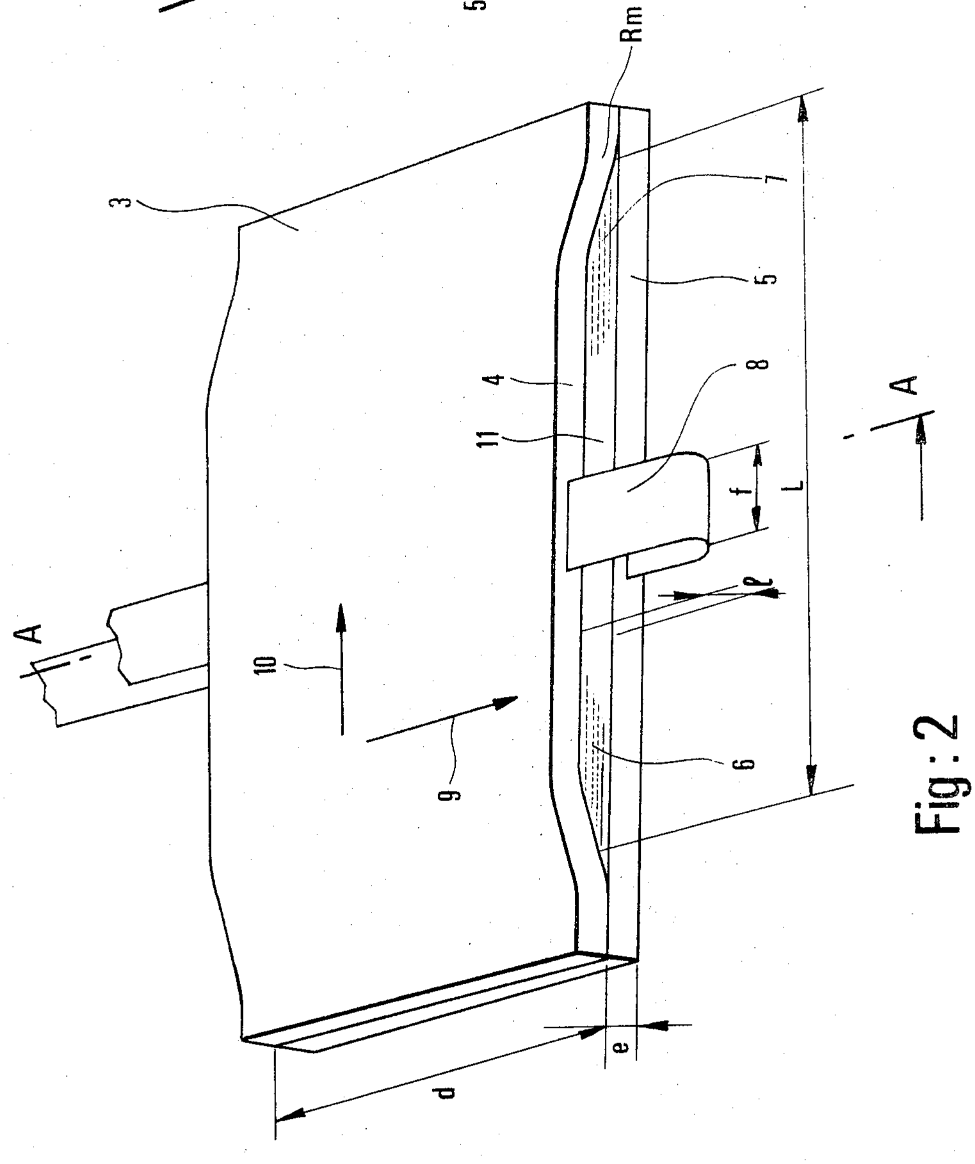
FIG. 2 is a view in perspective showing one embodiment of the invention.

In FIG. 2, which is a view in perspective of a low-level magnetic decoder in accordance with the invention, there is shown a magnetic circuit 3 having low reluctance. This circuit is designed in the form of a closed loop and is made up of two parallel components 4 and 5 which are in oppositely facing relation and joined together at both ends. Said components 4 and 5 have the same thickness and are made up of thin-film layers of Fe-Ni-Cr. There are shown in cross-section the primary and secondary windings 6 and 7 which are constituted by an alternate succession of electrically conducting and electrically insulating film layers. The primary winding 6 is placed at one of the two ends of the magnetic loop and the secondary winding 7 is placed at the other end. The control winding 8 which can advantageously be formed by a conducting layer of Cu, for example, passes through each component 4 and 5 strictly at the center of these latter along the axis of easy magnetization as shown by the arrow 9. The axis of hard magnetization which is located at right angles has similarly been shown by the arrow 10. Finally, the space 11 between the windings 6 and 7 is filled with insulating material such as SiO, for example.

Figure 3:
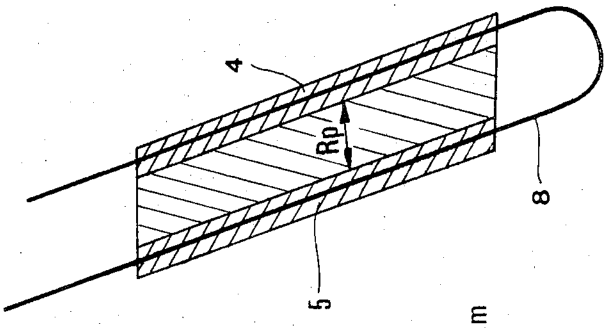
FIG. 3 is a sectional view taken along line A—A of the device of FIG. 2.

In FIG. 3, which is a sectional view taken along line A—A of FIG. 2, there are shown the components 4 and 5 which form the magnetic circuit and the control winding 8.

Said closed magnetic loop is such as to ensure maximum efficiency of the device. Physically, this results in the fact that the reluctance Rp which defines the greater part of the losses must be substantial with respect to the reluctance Rm which corresponds to channeling of the flux within the magnetic portions.

Using the following notation:

$e$ = thickness of the component 4 or the component 5 of the magnetic circuit
$l$ = thickness of the insulating material 11
$L$ = length of the loop
$d$ = width of the loop
$\mu_r$ = relative magnetic permeability of the loop
$\mu_o$ = magnetic permeability of the space ($\mu_o = 1$), We may write:

$$Rp = l/Ld\mu_o$$

$$Rm = 2\ L/ed\mu_o\mu_r$$

In order to obtain maximum efficiency, it is necessary to ensure that the ratio:

$$Rp/Rm = le\mu_r/2\ L^2$$

is of maximum value.

In point of fact, since $e$ and $\mu_r$ are fixed by the magnetic circuit, it is worthy of note that $L$ must be as short as possible and $l$ must be as long as possible. However, $L$ cannot be reduced beyond a certain value which is established by the minimum permissible distance between the primary winding 6 and secondary winding 7 since mutual induction phenomena would otherwise appear between the two windings. For example, it is in fact necessary to have a zero signal at the terminals of the secondary winding when the decoder is required to operate as a switch.

In the case of the device according to the invention, it will be noted that the number of turns or in this instance the number of electrically conducting layers of the primary and secondary windings can be chosen prior to construction of the decoder and in accordance with the intended function of this latter. It is thus possible to constitute a voltage raising or lowering circuit.

Figure 4:
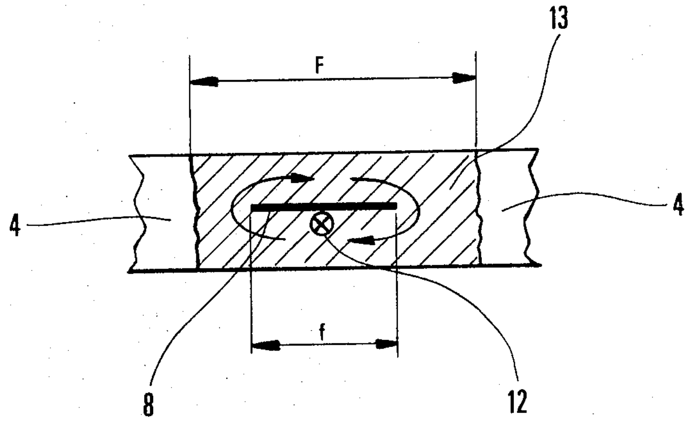
FIG. 4 is a fragmentary front view of the embodiment of FIG. 2.

FIG. 4 shows a front view of the central zone of one of the components 4 and 5 which form the magnetic loop. There can be seen in this figure the control winding 8 which is intended to pass through the center of each component 4 or 5.

It will now be assumed that a sufficient current passes at right angles to the plane of FIG. 4 through the control winding 8 in the direction indicated by the arrow 12 as shown and looking from the rear. A magnetic field is then produced within the winding 8 and this field saturates the magnetic circuit within the shaded zone 13. The permeability of the magnetic material of said zone then becomes equal to 1. In order that said field as thus produced should be completely closed and should not induce any spurious signal in one of the windings 6 or 7, the conducting layer which constitutes the control winding 8 must pass strictly through the center of each component 4 or 5.

Moreover, if we designate:

$F$ as the width of the saturated zone 13

$f$ as the width of the conducting layer 8, we may write that the reluctance $Rc$ which appears in each component 4 or 5 of the circuit is:

$$Rc = F/ed$$

wherein $F$ is a function of $f$ and of the control current.

The operation of the decoder as a switch is accordingly represented by the inequation:

$$Rc > Rp$$

This inequation in fact depends on the ratio of the transfer signal when the decoder is intended to operate as a signal transmitter to the residual signal which passes from the primary winding to the secondary winding and conversely (mutual induction) when the decoder is intended to operate as a switch.

The method of manufacture of the integrated low-level magnetic decoder in accordance with the arrangement contemplated by the invention consists as has been stated in the foregoing in employing the vacuum evaporation technique described in U.S. Pat. application Ser. No. 81,881. In the case of the embodiment of the decoder which is illustrated in FIG. 2, one-half of the magnetic circuit component 5 is first formed. A conducting film layer representing the control winding 8 is again deposited by vacuum evaporation. The second half of the component 5 is then formed. The windings 6 and 7 are then formed exactly as in the patent application which has been cited above. The alternate layers which make up these windings are closed in this case externally of the magnetic circuit. Finally, the fabrication process is completed by forming the magnetic circuit component 4, this operation being performed in two steps as in the case of the component 5. The cost price of an integrated decoder as thus manufactured is relatively low in comparison with the magnetic decoders which are already in existence since it can be produced by employing the evaporation technique in the same vacuum cycle.

It should clearly be understood that the invention is not limited in any sense to the embodiment which has been described with reference to the accompanying drawings and which has been given solely by way of example.

What we claim is:

1. An integrated low-level magnetic decoder, wherein said decoder comprises a magnetic circuit in the form of a closed loop and made up of two parallel components formed of identical magnetic material having the same thickness and joined together at the extremities thereof, a primary winding and a secondary winding housed within the interior and each at one end of said loop, a control winding located between said primary and secondary windings and passed through each of said two components strictly at the mid-point of the thickness thereof and along the axis of easy magnetization of the magnetic circuit, the space formed between said primary and secondary windings within the interior of the loop being filled with insulating material.

2. A decoder in accordance with claim 1, wherein said primary and secondary windings have a number of turns which is chosen beforehand.

3. A decoder in accordance with claim 1, wherein said control winding is constituted by a conducting layer.

* * * * *